(No Model.)

W. E. JACOBS.
ROAD SCRAPER.

No. 314,382. Patented Mar. 24, 1885.

Witnesses:
B. C. Fenwick
Rob't L. Fenwick

Inventor:
William E. Jacobs
by his att'ys
Fenwick & Lawrence

N. PETERS, Photo-Lithographer, Washington, D. C.

UNITED STATES PATENT OFFICE.

WILLIAM E. JACOBS, OF COLUMBUS, OHIO.

ROAD-SCRAPER.

SPECIFICATION forming part of Letters Patent No. 314,382, dated March 24, 1885.

Application filed January 28, 1884. (No model.)

*To all whom it may concern:*

Be it known that I, WILLIAM E. JACOBS, a citizen of the United States, residing at Columbus, in the county of Franklin and State of Ohio, have invented a new and useful Improvement in Road-Scrapers, of which the following, in connection with the accompanying drawings, is a specification.

This invention relates to a simple and cheap means whereby the swinging bail of a road-scraper can be readily connected and disconnected from the bowl, and thus, while expense is avoided, convenience is afforded by dispensing with the use of tools, keys and the like, in effecting a connection and disconnection, it only being necessary to invert the bowl with its bottom upward, turn the bail backward, insert its hinging ends by springing them through passages in the bail supporting and connecting brackets, and then to turn the bail forward to its operative position and readjust the bowl with its bottom downward.

Figure 1:
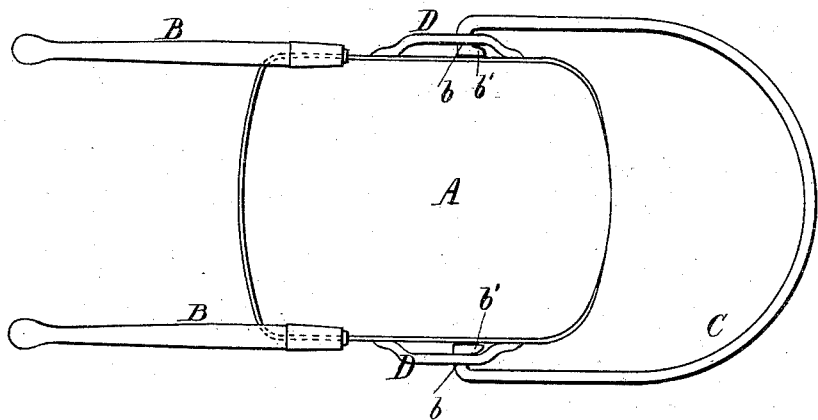
Figures 2, 3:
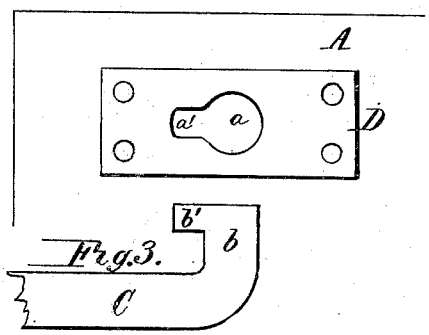
Figure 4:
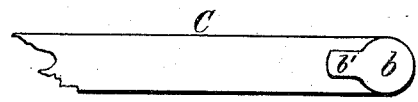
Figure 5:
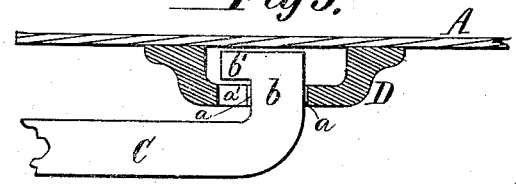
Figure 7:
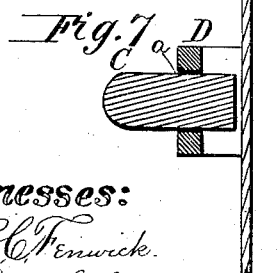
Figure 6:
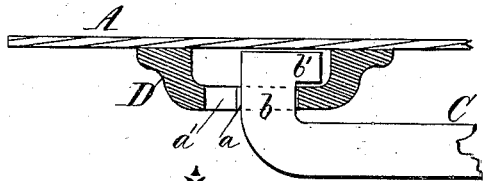

In the accompanying drawings, Figure 1 is a top view of an ordinary road-scraper bowl with my improved bail and bail supporting and connecting brackets applied to it and as adjusted for operation. Fig. 2 is an enlarged detail side view showing one of the brackets and a portion of the scraper-bowl. Fig. 3 is a detail top view showing one end of the bail and the same out of the bracket; Fig. 4, an inner edge or side view of Fig. 3; Fig. 5, a horizontal section of one end portion of the bail, one of the side brackets, and a portion of the bowl. In this view the bail is shown turned back to its position for entering the passage of the bracket. Fig. 6 is a similar view to Fig. 5, but the bail is turned forward; and Fig. 7 is a transverse section of Fig. 1, showing that the bail supporting and connecting bracket is open at top and bottom, and that dirt, gravel, or stones, which would be liable to clog the bail and render liable the breaking of either the bracket or the bail, can pass freely down and away from the hinge-connection.

A in the drawings represents the scraper-bowl, which may be of either cast or wrought metal or any other suitable material, while in its construction it may be as represented, or of any other better suited for the work to be done. To this bowl handles B and a swinging bail, C, are applied. A road-scraper which comprises a bowl, handles, and a swinging bail is not new, the same being commonly used upon roads for the purpose of scooping or scraping the earth while being drawn over the ground by a horse hitched to its bail.

The improvement in the scraper represented which I have made is this: To each side of the bowl A, I apply by means of screws or rivets a bracket, D, which is open at top and bottom, so as to offer no obstruction to the descent of dirt, gravel, or stones, and in the broad portion of this bracket a passage, $a\ a'$, is formed. The portion $a$ of the passage forms nearly a complete circle, while the portion $a'$ is in form of a narrow oblong slot, this slotted portion forming a narrower part of the passage, while the circular portion forms a larger part of the same. The circular part $a$ and the oblong part $a'$ of the passage unite with one another, and thus form a single passage of the form represented in Fig. 2. The bail at each end is formed with an inwardly-bent or right-angled hinging part, $b$, and with a lug, $b'$, standing nearly parallel with the face of the bracket D, as shown. The lug $b'$ is of a size less than the width and length of the slot $a'$, while the hinging part $b$ just fits the circular portion $a$ of the passage, as shown.

The bail is constructed of metal, and it can be sprung so as to have its hinging portions $b$ stand far enough apart to clear the brackets, and thus, when the bail is to be applied to the bowl, it is only necessary to invert the bowl, turn the bowed portion of the bail backward, spread the lugs $b'$ apart and bring them in line with the slot $a'$, and the angular hinging portions in line with the circular parts $a$ of the passages in the brackets, and then to allow the lugs and angular portions to spring into the said passages, and thereupon turn the bail forward and adjust the scraper-bowl so as to have its bottom downward. The parts thus connected cannot be casually disconnected, and in order to separate them it is necessary to turn the bowl bottom upward and swing the bail backward and spring the lugs and angular portions through the passages of the brackets.

My open brackets with passage $a\ a'$, together with the bail having angular ends and lugs, provide a means of connection between the bail and bowl of a scraper which is not liable to be broken by dirt, gravel, or stones wedging in between the lugs and the brackets, while at the same time the fastening is a very complete and simple one, requiring neither tools nor keys for the purpose of effecting a connection between the bowl and bail.

My means of connecting and supporting the bail of scraper may be modified in different ways without departing from the combination which constitutes my invention. For instance, the brackets D might be made with closed tops and open bottoms. The form of the bracket may be such as represented; or it may be of any other suitable form which will permit the passage $a\ a'$ to be formed in it, and also will afford room between itself and the bowl for the lug $b'$ to occupy the positions shown in Figs. 3 and 4 when the bail is turned either backward or forward.

What I claim as my invention, and desire to secure by Letters Patent, is—

The combination of the scraper bowl A, brackets D, open at top and bottom, and provided with a passage, $a\ a'$, and a spring-bail having angular portions $b$, with lugs $b'$, substantially as and for the purpose described.

WILLIAM E. JACOBS.

Witnesses:
J. D. SULLIVAN,
E. T. TULLER.